United States Patent
Kim et al.

(10) Patent No.: US 9,841,267 B2
(45) Date of Patent: Dec. 12, 2017

(54) SURFACE ROUGHNESS SENSOR APPARATUS AND PROCESSING TOOL STRUCTURE USING THE SAME

(71) Applicant: Soongsil University Research Consortium Techno-Park, Seoul (KR)

(72) Inventors: Jin Oh Kim, Seoul (KR); Jeong Gil Hwang, Seoul (KR)

(73) Assignee: SOONGSIL UNIVERSITY RESEARCH CONSORTIUM TECHNO-PARK, Seoul (KR)

(*) Notice: Subject to any disclaimer, the term of this patent is extended or adjusted under 35 U.S.C. 154(b) by 22 days.

(21) Appl. No.: 14/994,259

(22) Filed: Jan. 13, 2016

(65) Prior Publication Data

US 2016/0223314 A1  Aug. 4, 2016

(30) Foreign Application Priority Data

Feb. 4, 2015  (KR) .................. 10-2015-0017429

(51) Int. Cl.
*G01B 7/34* (2006.01)
*G01B 5/28* (2006.01)

(52) U.S. Cl.
CPC ........ *G01B 7/34* (2013.01); *G01B 5/28* (2013.01)

(58) Field of Classification Search
CPC ................................ G01B 7/34; G01B 7/345
See application file for complete search history.

(56) References Cited

U.S. PATENT DOCUMENTS

2016/0178481 A1* 6/2016 Fudulea ............... B60T 8/171
                                                       701/33.9

FOREIGN PATENT DOCUMENTS

| JP | 2002-066879 A | 3/2002 |
|----|---------------|--------|
| JP | 2003-311610 A | 11/2003 |
| JP | 2012-021992 A | 2/2012 |
| KR | 10-0125442 B1 | 12/1997 |
| KR | 20-0178075 Y1 | 4/2000 |

* cited by examiner

*Primary Examiner* — Robert R Raevis
(74) *Attorney, Agent, or Firm* — Pearne & Gordon LLP

(57) ABSTRACT

The present disclosure relates to a surface roughness sensor apparatus. The surface roughness sensor apparatus includes: a rotatable rotation shaft; a piezoelectric sensor provided along a circumference of the rotation shaft, rotated by rotation of the rotation shaft, and configured to generate a sensing signal in response to a pressure applied by a surface of an object as being in direct contact with the surface of the object; and a signal transfer unit configured to transfer the sensing signal generated and transmitted by the piezoelectric sensor to the outside of the sensor apparatus, and the piezoelectric sensor may be rotated in a direction in which a relative movement between the piezoelectric sensor and the surface of the object is made at a contact point with the object to minimize damage to the surface of the object.

9 Claims, 7 Drawing Sheets

US 9,841,267 B2

SURFACE ROUGHNESS SENSOR APPARATUS AND PROCESSING TOOL STRUCTURE USING THE SAME

TECHNICAL FIELD

The present disclosure relates to a surface roughness sensor apparatus and a processing tool structure including the same.

BACKGROUND ART

Generally, surface roughness measurement methods are classified into an optical method and a stylus method. To be specific, the optical method is classified into a light sectioning method and an interference method. The light sectioning method refers to a method of irradiating a slit beam to a surface of an object and measuring a surface roughness using light reflected therefrom. The interference method refers to a method of measuring a surface roughness by observing an interference pattern of light. Regarding the optical measurement method, conventionally, Korean Patent No. 10-0125442 discloses a method and apparatus for optical detection of a surface roughness by generating a light bead on a material surface and then detecting a surface roughness using light reflected therefrom.

Further, the stylus method refers to a method of measuring a surface roughness by bringing a diamond stylus into contact with a surface of an object and checking unevenness while moving the diamond stylus. Regarding the stylus measurement method, Korean Utility Model No. 20-0178075 discloses a portable surface roughness measuring apparatus which measures a roughness of a specimen with a stylus unit and compares the measured roughness with a roughness of a comparison specimen.

The optical measurement method has some problems of having low precision, difficulty in measurement while an object is moved at a predetermined speed or more, and a complicated structure. The stylus measurement method uses a diamond stylus, and, thus, has a risk of damage to a surface of an object. Further, the stylus measurement method has a problem of difficulty in measurement of a surface roughness if the object has a smooth surface.

DISCLOSURE OF THE INVENTION

Problems to be Solved by the Invention

In view of the foregoing, the present disclosure provides a surface roughness sensor apparatus and a processing tool structure including the surface roughness sensor apparatus capable of precisely measuring a surface roughness while minimizing damage to an object and also capable of precisely measuring a surface roughness of a moving object, an object having a smooth surface, or the like.

Means for Solving the Problems

In accordance with an exemplary embodiment of the present disclosure, a surface roughness sensor apparatus includes: a rotatable rotation shaft; a piezoelectric sensor provided along a circumference of the rotation shaft, rotated by rotation of the rotation shaft, and configured to generate a sensing signal in response to a pressure applied by a surface of an object as being in direct contact with the surface of the object; and a signal transfer unit configured to transfer the sensing signal generated and transmitted by the piezoelectric sensor to the outside of the sensor apparatus, and the piezoelectric sensor may be rotated in a direction in which a relative movement between the piezoelectric sensor and the surface of the object is made at a contact point with the object to minimize damage to the surface of the object.

Effect of the Invention

According to the above-described exemplary embodiment of the present disclosure, since a piezoelectric sensor configured to measure a surface roughness of an object as being in direct contact with the object is included, it is possible to precisely measure the surface roughness of the object regardless of a surface smoothness of the object. Further, since a rotation shaft configured to rotate the piezoelectric sensor in a direction in which the piezoelectric sensor is relatively moved with respect to the object is included, it is possible to precisely measure the surface roughness of the object while minimizing damage to the object regardless of a movement of the object.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
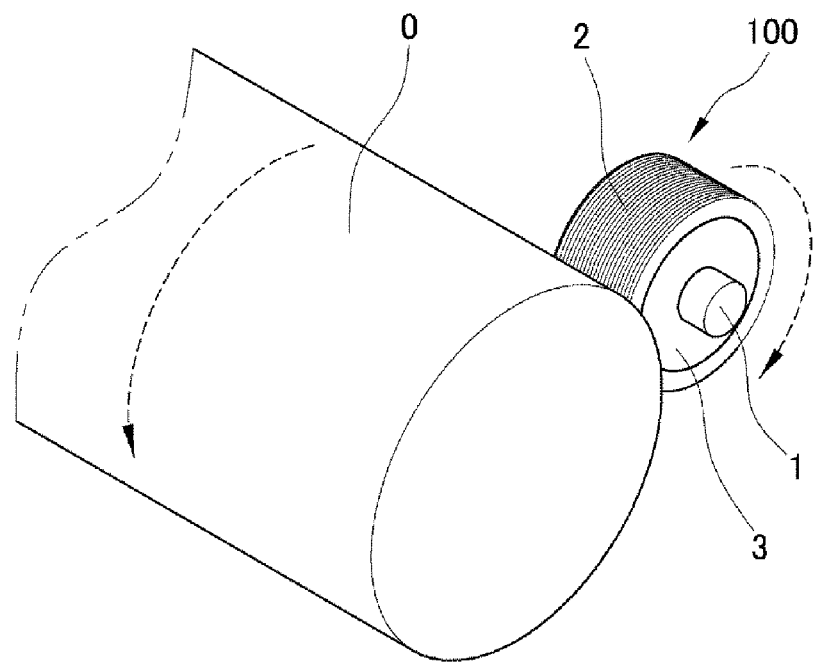
FIG. 1 is a schematic conceptual diagram illustrating a status where a surface roughness sensor apparatus measures a surface roughness of an object in accordance with an example of the present disclosure.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the term "on" that is used to designate a position of one element with respect to another element includes both a case that the one element is adjacent to the another element and a case that any other element exists between these two elements.

Further, through the whole document, the term "comprises" or "includes" and/or "comprising" or "including" used in the document means that one or more other components, steps, operation and/or existence or addition of elements are not excluded in addition to the described components, steps, operation and/or elements unless context dictates otherwise. Through the whole document, the term "about" or "approximately" or "substantially" is intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

The present disclosure relates to a surface roughness sensor apparatus and a processing tool structure including the same.

Firstly, a surface roughness sensor apparatus in accordance with an example of the present disclosure (hereinafter, referred to as "the present surface roughness sensor apparatus") 100 will be described.

FIG. 1 is a schematic conceptual diagram illustrating a status where the surface roughness sensor apparatus 100 measures a surface roughness of an object 0 in accordance with an example of the present disclosure.

Referring to FIG. 1, the surface roughness sensor apparatus 100 includes: a rotatable rotation shaft 1; a piezoelectric sensor 2 provided along a circumference of the rotation shaft 1, rotated by rotation of the rotation shaft 1, and configured to generate a sensing signal in response to a pressure applied by a surface of an object 0 as being in direct contact with the surface of the object 0; and a signal transfer unit 3 configured to transfer the sensing signal generated and transmitted by the piezoelectric sensor 2 to the outside.

Since the surface roughness sensor apparatus 100 includes the piezoelectric sensor 2 configured to generate a sensing signal in response to a pressure applied from the surface of the object 0 as being in direct contact with the surface of the object 0, the surface roughness sensor apparatus 100 can precisely measure a surface roughness of the object 0.

Further, referring to FIG. 1, the piezoelectric sensor 2 is rotated in a direction in which a relative movement between the piezoelectric sensor 2 and the surface of the object 0 is made to minimize damage to the surface of the object 0.

Referring to FIG. 1, the relative movement between the piezoelectric sensor 2 and the object 0 may mean that while the object 0 and the piezoelectric sensor 2 are in a stationary state, rotation of the object 0 causes a change in a location of the surface of the object 0 with respect to a location of the piezoelectric sensor 2. In this case, the direction in which a relative movement between the piezoelectric sensor 2 and the surface of the object 0 is made at a contact point between the piezoelectric sensor 2 and the object 0 to minimize damage to the surface of the object may be a direction of rotation of the object 0.

Details thereof will be described with reference to FIG. 1. As illustrated in FIG. 1, since the object 0 is rotated in a counterclockwise direction while the object 0 and the piezoelectric sensor 2 are in a stationary state, if a relative movement between the piezoelectric sensor 2 and the surface of the object 0 is made, the direction in which the relative movement between the piezoelectric sensor 2 and the surface of the object 0 is made at the contact point between the piezoelectric sensor 2 and the object 0 may be an upward direction. Herein, the piezoelectric sensor 2 may be rotated in the upward direction. In other words, the piezoelectric sensor 2 may be rotated in a clockwise direction.

Further, in another example, the relative movement between the piezoelectric sensor 2 and the surface of the object 0 may be made by a movement of the piezoelectric sensor 2 along the surface of the object 0 while the object 0 is in a stationary state. To be specific, when the object 0 is in a stationary state, the piezoelectric sensor 2 is moved along a longitudinal direction of the object 0, and, thus, the piezoelectric sensor 2 may be relatively moved with respect to the surface of the object 0. In this case, the piezoelectric sensor 2 may be rotated along the longitudinal direction of the object 0.

That is, the piezoelectric sensor 2 may be rotated corresponding to a movement of the surface of the object 0.

As described above, the surface roughness sensor apparatus 100 measures a surface roughness of the object 0 by bringing piezoelectric sensor 2, which can be rotated by the rotation shaft 1, into direct contact with the object 0. Further, since the surface roughness sensor apparatus 100 measures a surface roughness of the object 0 while rotating the piezoelectric sensor 2 in a direction of a relative movement with respect to the object 0, the surface roughness sensor apparatus 100 can precisely measure a surface roughness while minimizing damage to the object 0.

Particularly, in order to measure a surface roughness not of a part of the surface of the object 0 but of the entire surface of the object 0, generally, one or more of the surface of the object 0 and a sensor for measuring the surface need to be moved. Therefore, the surface roughness sensor apparatus 100 configured to be rotated corresponding to a movement of the surface of the object 0 may be very useful for accurately measuring a surface roughness while minimizing damage to the surface of the object 0.

Hereinafter, a configuration of the surface roughness sensor apparatus 100 will be described in detail.

Firstly, the piezoelectric sensor 2 will be described in detail.

Figure 2:
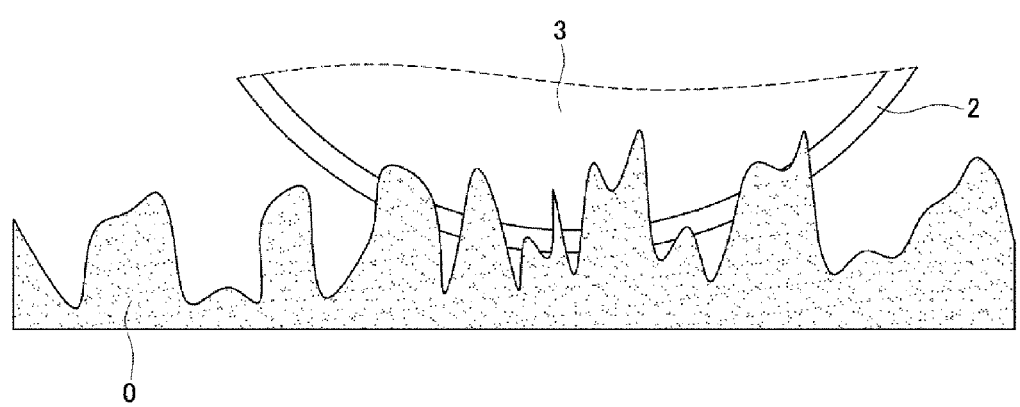
FIG. 2 is a schematic conceptual diagram provided to describe the principle of a piezoelectric sensor for sensing a surface roughness of an object.
Figure 3:
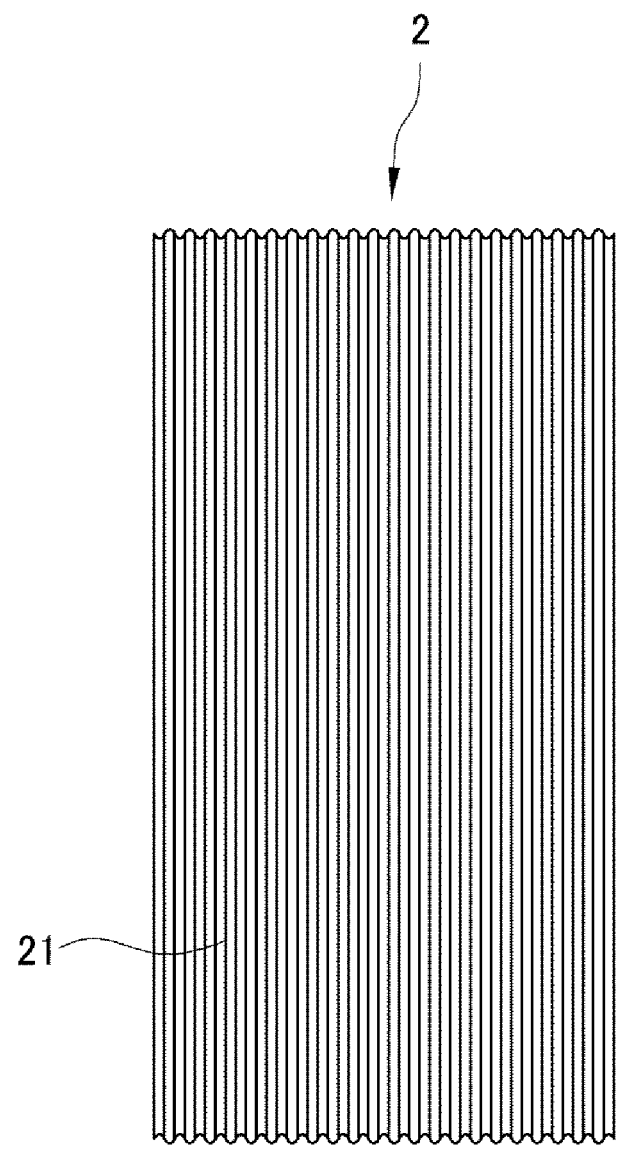
FIG. 3 is a schematic conceptual diagram illustrating a surface of a piezoelectric sensor for describing a sensor line included in the piezoelectric sensor.

FIG. 2 is a schematic conceptual diagram provided to describe the principle of a piezoelectric sensor 2 for sensing a surface roughness of the object 0, and FIG. 3 is a schematic conceptual diagram illustrating a surface of the piezoelectric sensor 2 for describing a sensor line 21 included in the piezoelectric sensor 2.

Referring to FIG. 2, if the piezoelectric sensor 2 is brought into contact with the surface of the object 0, an uneven portion of the object 0 applies a pressure to the piezoelectric sensor 2. The piezoelectric sensor 2 generates a sensing signal depending on an intensity of the applied pressure and transfers the sensing signal to the signal transfer unit 3. Then, an intensity and a cycle of the transferred sensing signal are analyzed, and, thus, a surface state (roughness, or the like) of the object 0 can be detected. For reference, the sensing signal transferred to the signal transfer unit 3 may be transferred to an analyzer, and the analyzer may analyze the transferred sensing signal.

Referring to FIG. 3, the piezoelectric sensor 2 may include a sensor line 21 configured to sense a pressure from the surface of the object 0. As illustrated in FIG. 3, the sensor line 21 may be provided on a surface of the piezoelectric sensor 2. Further, multiple sensor lines 21 may be spaced apart from each other at a predetermined distance.

Herein, the predetermined distance may be determined by a sensitivity required for the piezoelectric sensor 2.

To be more specific, as the distance between the sensor lines 21 is decreased, a distance between parts of the surface of the object 0 applying a pressure to the sensor lines 21 may be decreased and the sensitivity of the piezoelectric sensor 2 may be improved. On the other hand, as the distance between the sensor lines 21 is increased, a distance between parts of the surface of the object 0 applying a pressure to the sensor lines 21 may be increased and the sensitivity of the piezoelectric sensor 2 may be decreased.

The sensitivity required for the piezoelectric sensor 2 may vary depending on the use of a surface roughness to be measured. Therefore, the distance between the sensor lines 21 may be previously set to achieve the sensitivity required for the piezoelectric sensor 2.

Hereinafter, the signal transfer unit 3 will be described in detail.

Figure 4:
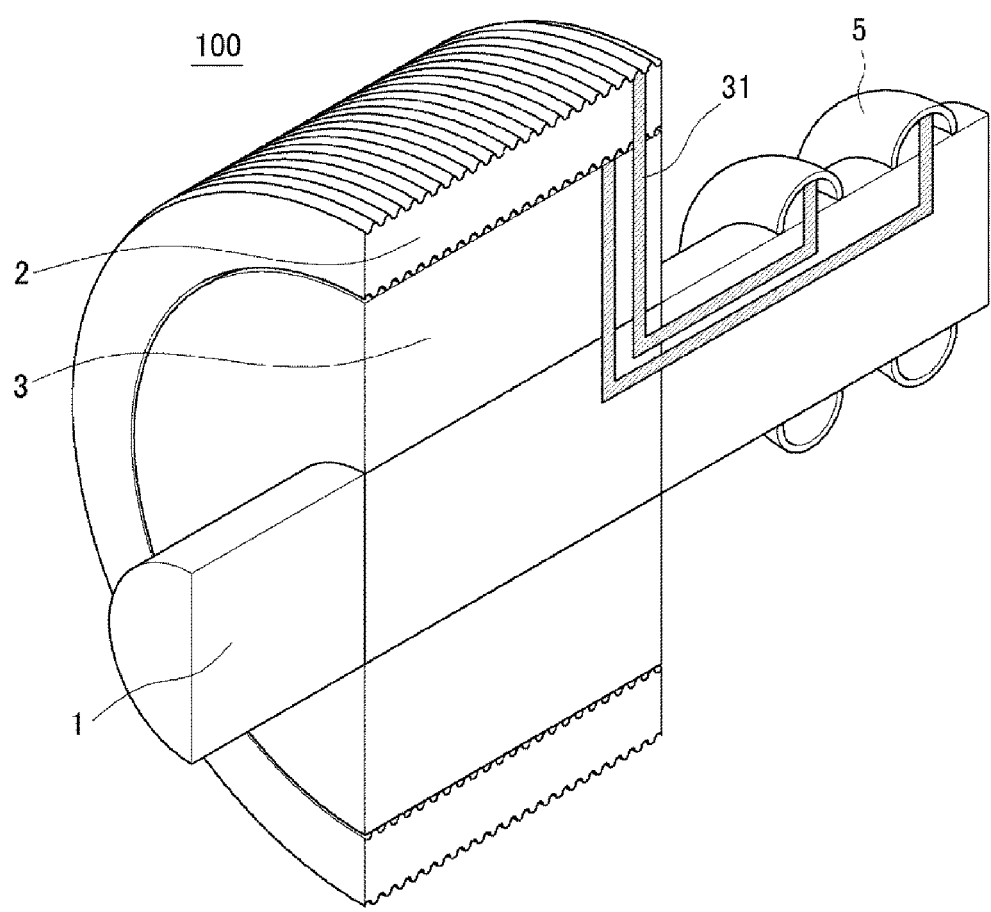
FIG. 4 is a schematic cross-sectional view of a surface roughness sensor apparatus in accordance with an example of the present disclosure for describing a signal transfer unit in accordance with an exemplary embodiment of the present disclosure.
Figure 5A:
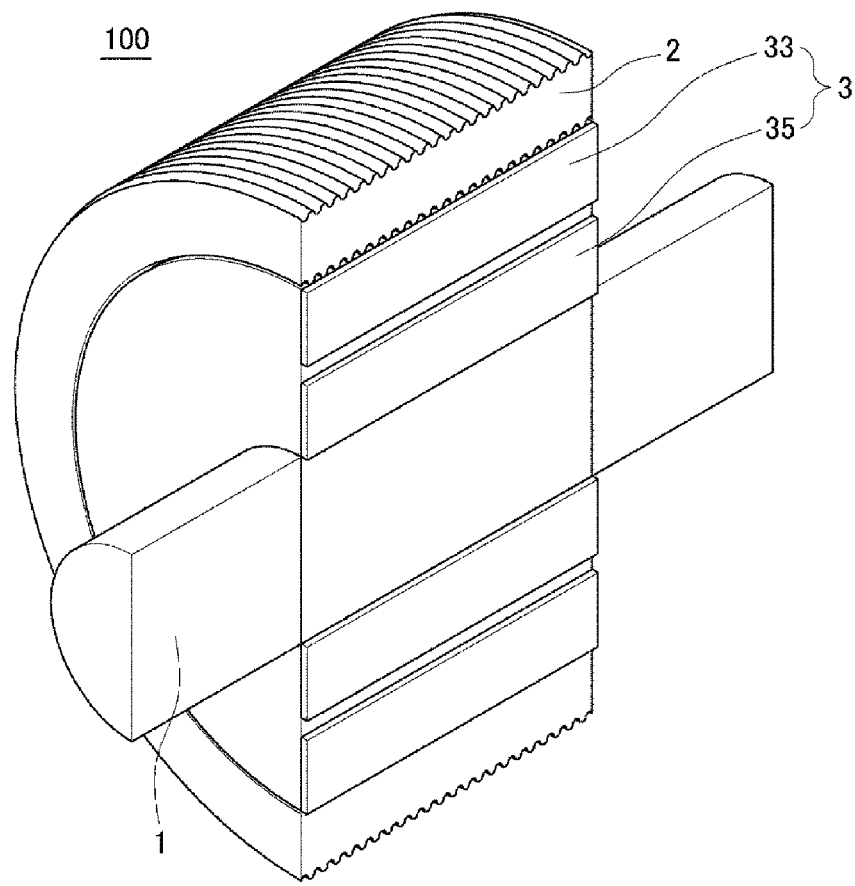
FIG. 5A is a schematic cross-sectional view of a surface roughness sensor apparatus in accordance with an example of the present disclosure for describing a signal transfer unit in accordance with another exemplary embodiment of the present disclosure.
Figure 5B:
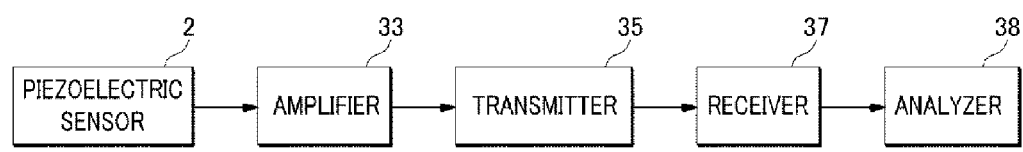
FIG. 5B is a schematic block diagram illustrating a step of transferring a sensing signal by the signal transfer unit in accordance with another exemplary embodiment of the present disclosure.

FIG. 4 is a schematic cross-sectional view of a surface roughness sensor apparatus 100 for describing a signal transfer unit 3 in accordance with an exemplary embodiment of the present disclosure, FIG. 5A is a schematic cross-sectional view of the surface roughness sensor apparatus 100 for describing the signal transfer unit 3 in accordance with another exemplary embodiment of the present disclosure, and FIG. 5B is a schematic block diagram illustrating a step of transferring a sensing signal by the signal transfer unit 3 in accordance with another exemplary embodiment of the present disclosure.

Referring to FIG. 4 and FIG. 5A, the signal transfer unit 3 may be arranged between the piezoelectric sensor 2 and the rotation shaft 1.

Further, referring to FIG. 4, the signal transfer unit 3 may include an electric wire part 31 configured to transfer the sensing signal generated by the piezoelectric sensor 2. Furthermore, as shown in FIG. 4, the surface roughness sensor apparatus 100 may include a slip ring 5 configured to transfer the sensing signal transferred through the electric wire part 31 to an external electric wire. In this case, the sensing signal generated by the piezoelectric sensor 2 may be transferred to the slip ring 5 through the electric wire part 31. The sensing signal transferred to the slip ring 5 may be transferred to the analyzer and analyzed by the analyzer. Through this process, a surface roughness of the object 0 may be detected and calculated.

Further, referring to FIG. 5A, in yet another exemplary embodiment of the signal transfer unit 3, the signal transfer unit 3 may include an amplifier 33 configured to amplify the sensing signal generated and transmitted by the piezoelectric sensor 2 and a transmitter 35 configured to transfer (transmit) the amplified sensing signal.

In this case, referring to FIG. 5B, the sensing signal generated by the piezoelectric sensor 2 may be amplified by the amplifier 33 and then wirelessly transferred by the transmitter 35 to a receiver 37. The sensing signal transferred to the receiver may be transferred to an analyzer 38 and analyzed by the analyzer 38. Through this process, a surface roughness of the object 0 may be detected and calculated.

The effects of the surface roughness sensor apparatus 100 will be further described in detail.

Figure 6:
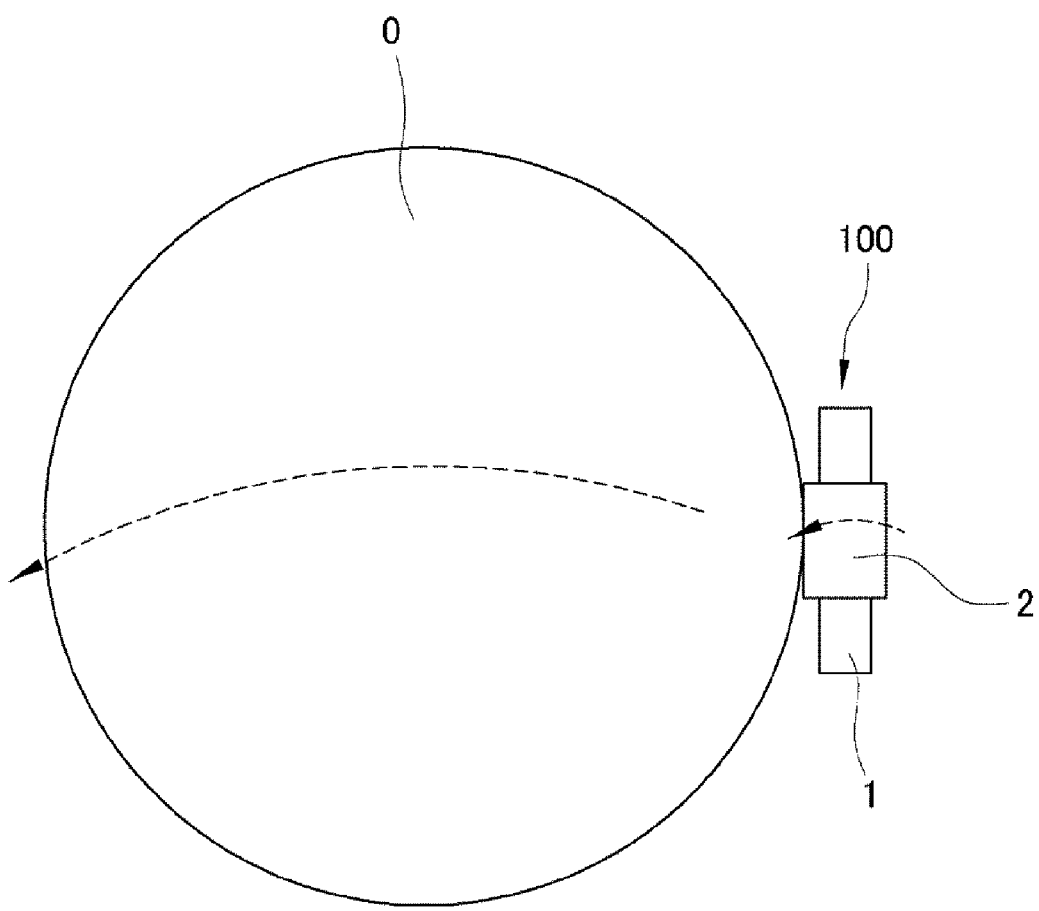
FIG. 6 is a schematic conceptual diagram illustrating a status where a surface roughness sensor apparatus in accordance with an example of the present disclosure measures a surface roughness of a spherical object as viewed from the top.

FIG. 6 is a schematic conceptual diagram illustrating a status where the surface roughness sensor apparatus 100 measures a surface roughness of the spherical object 0 as viewed from the top.

As shown in FIG. 6, according to the surface roughness sensor apparatus 100, a surface roughness of the object 0 may be measured by fixing a location of the surface roughness sensor apparatus 100 and rotating the object 0 only. Since the surface roughness sensor apparatus 100 is not moved, it is possible to suppress a decrease in precision of a measured surface roughness caused by vibration generated by a movement of the surface roughness sensor apparatus 100.

Hereinafter, a processing tool structure in accordance with an example of the present disclosure (hereinafter, referred to as "the present processing tool structure") including the above-described surface roughness sensor apparatus 100 in accordance with an example of the present disclosure will be described. However, components identical or similar to those explained above in the surface roughness sensor apparatus 100 in accordance with an example of the present disclosure will be assigned identical reference numerals, and explanation thereof will be briefly provided or omitted.

Figure 7:
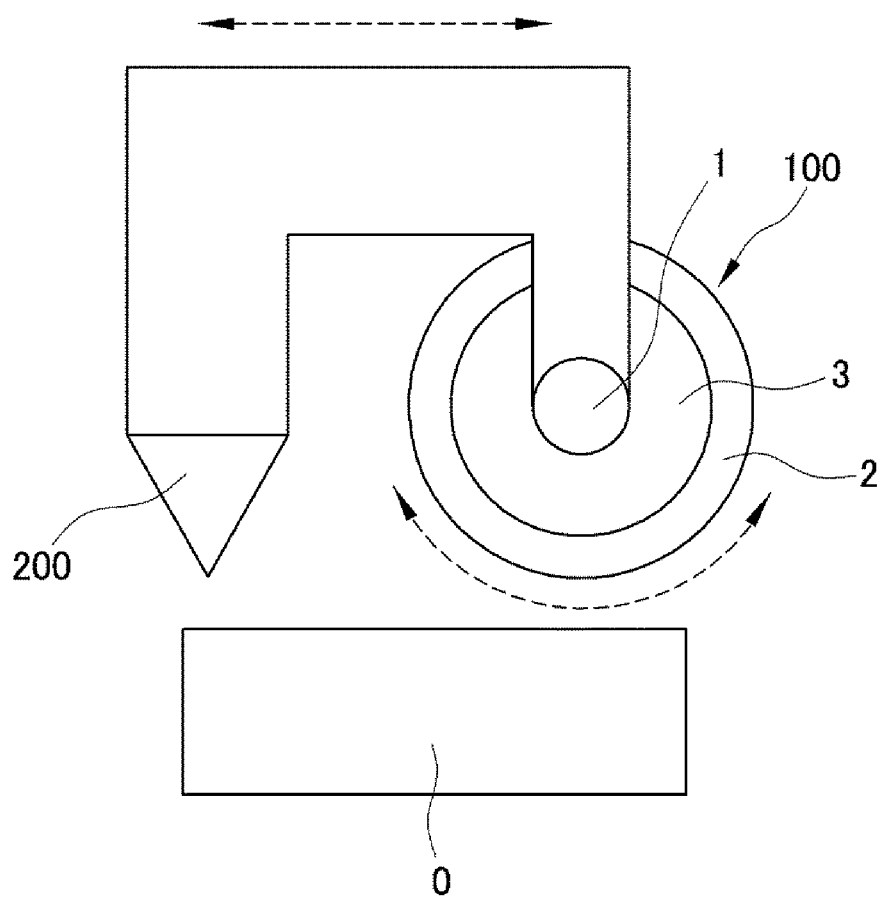
FIG. 7 is a schematic conceptual diagram illustrating a status where a processing unit and a surface roughness sensor apparatus are relatively moved with respect to an object in a stationary state to process the object and measure a surface roughness of the object as viewed from the side for describing a processing tool structure in accordance with an example of the present disclosure.
Figure 8:
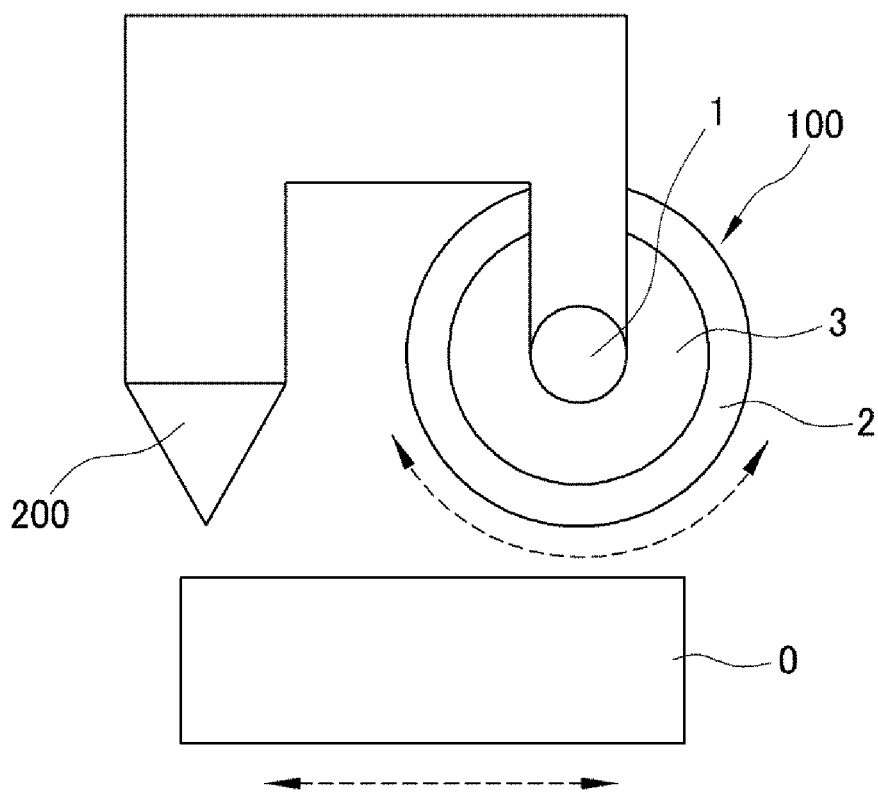
FIG. 8 is a schematic conceptual diagram illustrating a status where an object is relatively moved with respect to a processing unit and a surface roughness sensor apparatus in a stationary state to process the object and measure a surface roughness of the object as viewed from the side for describing a processing tool structure in accordance with an example of the present disclosure.

FIG. 7 is a schematic conceptual diagram illustrating a status where a processing unit 200 and the surface roughness sensor apparatus 100 are relatively moved with respect to the object 0 in a stationary state to process the object 0 and measure a surface roughness of the object 0 as viewed from the side, and FIG. 8 is a schematic conceptual diagram illustrating a status where the object 0 is relatively moved with respect to the processing unit 200 and the surface roughness sensor apparatus 100 in a stationary state to process the object 0 and measure a surface roughness of the object 0 as viewed from the side.

For reference, FIG. 7 and FIG. 8 are conceptual diagrams and exaggeratingly illustrate the processing unit 200 and the surface roughness sensor apparatus 100 as not being in contact with the surface of the object 0 in order to illustrate operations of some components in FIG. 7 and FIG. 8 in detail. However, in an exemplary embodiment of the present disclosure, the processing unit 200 and the surface roughness sensor apparatus 100 may be brought into contact with the surface of the object 0.

Referring to FIG. 7 and FIG. 8, the present processing tool structure includes: the processing unit 200 configured to process the object 0; and the surface roughness sensor apparatus 100.

Since the processing tool structure includes the processing unit 200 and the surface roughness sensor apparatus 100, it is possible to continuously monitor the surface of the object 0 by measuring a surface roughness of the object 0 while processing the object 0. Accordingly, the processing tool structure can actively react to a surface state of the object 0 and thus precisely process the object 0.

For example, as shown in FIG. 7 and FIG. 8, the processing unit 200 and the surface roughness sensor apparatus 100 may be provided as being integrated with each other. For example, the surface roughness sensor apparatus 100 may be provided on one side of the processing unit 200. Therefore, the processing unit 200 and the surface roughness sensor apparatus 100 may be operated as being interlocked with each other.

Further, referring to FIG. 7 and FIG. 8, the processing unit 200 and the surface roughness sensor apparatus 100 may be relatively moved with respect to the surface of the object 0. This may mean that one of the object 0 and the processing tool structure (the processing unit 200 and the surface roughness sensor apparatus 100) is moved with respect to the other. For example, as shown in FIG. 7, the processing unit 200 and the surface roughness sensor apparatus 100 may be moved with respect to the object 0 in a stationary state, and, thus, a relative movement with respect to the surface of the object 0 may be made. Otherwise, as shown in FIG. 8, the object 0 may be moved with respect to the processing unit 200 and the surface roughness sensor apparatus 100 in a stationary state, and, thus, a relative movement of the processing unit 200 and the surface roughness sensor apparatus 100 with respect to the surface of the object 0 may be made.

Further, as shown in FIG. 7, according to the present processing tool structure, while the object 0 is in a stationary state, the processing unit 200 and the surface roughness sensor apparatus 100 are moved with respect to the object 0, and, thus, it is possible to process the object 0 and measure a surface roughness of the object 0.

For example, referring to FIG. 7, while the object 0 is in a stationary state, if the processing unit 200 and the surface roughness sensor apparatus 100 are moved in one direction (see, for example, 9 o'clock direction in FIG. 7), the one direction may be the direction in which a relative movement between the piezoelectric sensor 2 and the surface of the object 0 is made at the contact point between the piezoelectric sensor 2 and the object 0. The piezoelectric sensor 2 may be rotated in the one direction, i.e., counterclockwise direction.

Further, as shown in FIG. 8, according to the present processing tool structure, while the processing unit 200 and the surface roughness sensor apparatus 100 are in a stationary state, the object 0 is moved with respect to the processing unit 200 and the surface roughness sensor apparatus 100, and, thus, it is possible to process the object 0 and measure a surface roughness of the object 0.

For example, referring to FIG. 8, while processing unit 200 and the surface roughness sensor apparatus 100 are in a stationary state, if the object 0 is moved in one direction (see, for example, 3 o'clock direction in FIG. 8), the one direction may be the direction in which a relative movement between the piezoelectric sensor 2 and the surface of the object 0 is made at the contact point between the piezoelectric sensor 2 and the object 0. The piezoelectric sensor 2 may be rotated in the one direction, i.e., counterclockwise direction.

Meanwhile, the processing performed by the present processing tool structure to the object 0 may be, for example, but not limited to, a milling process. Further, if the processing performed by the present processing tool structure to the object 0 is a milling process, the processing unit 200 may be a milling device.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

EXPLANATION OF CODES

| 1: Rotation shaft | 2: Piezoelectric sensor |
|---|---|
| 21: Sensor line | 3: Signal transfer unit |
| 31: Electric wire part | 33: Amplifier |
| 35: Transmitter | 5: Slip ring |
| 0: Object | 100: Surface roughness sensor apparatus |
| 200: Processing unit | |

We claim:

1. A surface roughness sensor apparatus that measures a surface roughness of an object, comprising:
   a rotatable rotation shaft;
   a signal transfer unit provided along the circumference of the rotation shaft and rotated by rotation of the rotation shaft; and
   a piezoelectric sensor concentric with the rotated shaft and provided along a circumference of the signal transfer unit,
   wherein the piezoelectric sensor is configured to generate a sensing signal in response to a pressure applied by a surface of the object as being in direct contact with the surface of the object; and
   the signal transfer unit is configured to transfer the sensing signal generated by the piezoelectric sensor to outside of the sensor apparatus,
   wherein the piezoelectric sensor is rotated in a direction in which a relative movement between the piezoelectric sensor and the surface of the object is made at a contact point with the object to minimize damage to the surface of the object.

2. The surface roughness sensor apparatus of claim 1, wherein the piezoelectric sensor generates the sensing signal depending on an intensity of the pressure applied from the object when being in contact with the surface of the object.

3. The surface roughness sensor apparatus of claim 1, wherein the piezoelectric sensor includes multiple sensor lines spaced apart from each other at a predetermined distance on a surface of the piezoelectric sensor.

4. The surface roughness sensor apparatus of claim 1, wherein the signal transfer unit includes an electric wire part configured to transfer the sensing signal generated and transmitted by the piezoelectric sensor.

5. The surface roughness sensor apparatus of claim 4, further comprising:
a slip ring configured to transfer the sensing signal transferred through the electric wire part to an external electric wire.

6. The surface roughness sensor apparatus of claim 1, wherein the signal transfer unit includes:
an amplifier configured to amplify the sensing signal generated and transmitted by the piezoelectric sensor; and
a transmitter configured to transfer the amplified sensing signal.

7. A processing tool structure that processes the object, comprising:
a processing unit configured to process the object; and
the surface roughness sensor apparatus of claim 1 which is connected to one side of the processing unit,
wherein the surface roughness sensor apparatus measures the surface roughness of the object.

8. The processing tool structure of claim 7:
wherein the processing unit and the surface roughness sensor apparatus are integrated to be moved as being interlocked with each other.

9. The processing tool structure of claim 7, wherein the processing unit and the surface roughness sensor apparatus are relatively moved with respect to a surface of the object.

* * * * *